United States Patent [19]
Pollinger et al.

[11] 3,738,680
[45] June 12, 1973

[54] PNEUMATIC SUSPENSION SYSTEM FOR VEHICLES

[75] Inventors: Hans Pollinger, Munich; Alfred Pohla, Neufahrn; Hans Kirchlechner, Munich, all of Germany

[73] Assignee: Knorr-Bremse GmbH, Munich, Germany

[22] Filed: Apr. 7, 1971

[21] Appl. No.: 131,938

[30] Foreign Application Priority Data
Apr. 9, 1970   Germany............... P 20 16 959.9

[52] U.S. Cl............................. 280/124 F, 267/65 D
[51] Int. Cl........................................... B60g 17/04
[58] Field of Search............. 280/124 F; 267/65 D; 105/197 B

[56] References Cited
UNITED STATES PATENTS

| | | | |
|---|---|---|---|
| 3,027,176 | 3/1962 | Frick | 267/65 D |
| 2,991,804 | 7/1961 | Merkle | 267/65 D |
| 3,064,994 | 11/1962 | Limmer | 267/65 D |
| 3,573,884 | 4/1971 | Pollinger | 105/197 B |

*Primary Examiner*—Philip Goodman
*Attorney*—Edmund M. Jaskiewicz

[57] ABSTRACT

A vehicle is supported by two pneumatic bellows at each end thereof to form a four-point suspension in which each of the bellows is individually controlled by its own control valve. Switching valves are connected to two of the bellows and their respective control valves so that these two bellows may be operated together jointly whereby the entire vehicle is then supported by a three-point suspension. The switching means may be actuated in response to the speed of the vehicle.

7 Claims, 1 Drawing Figure

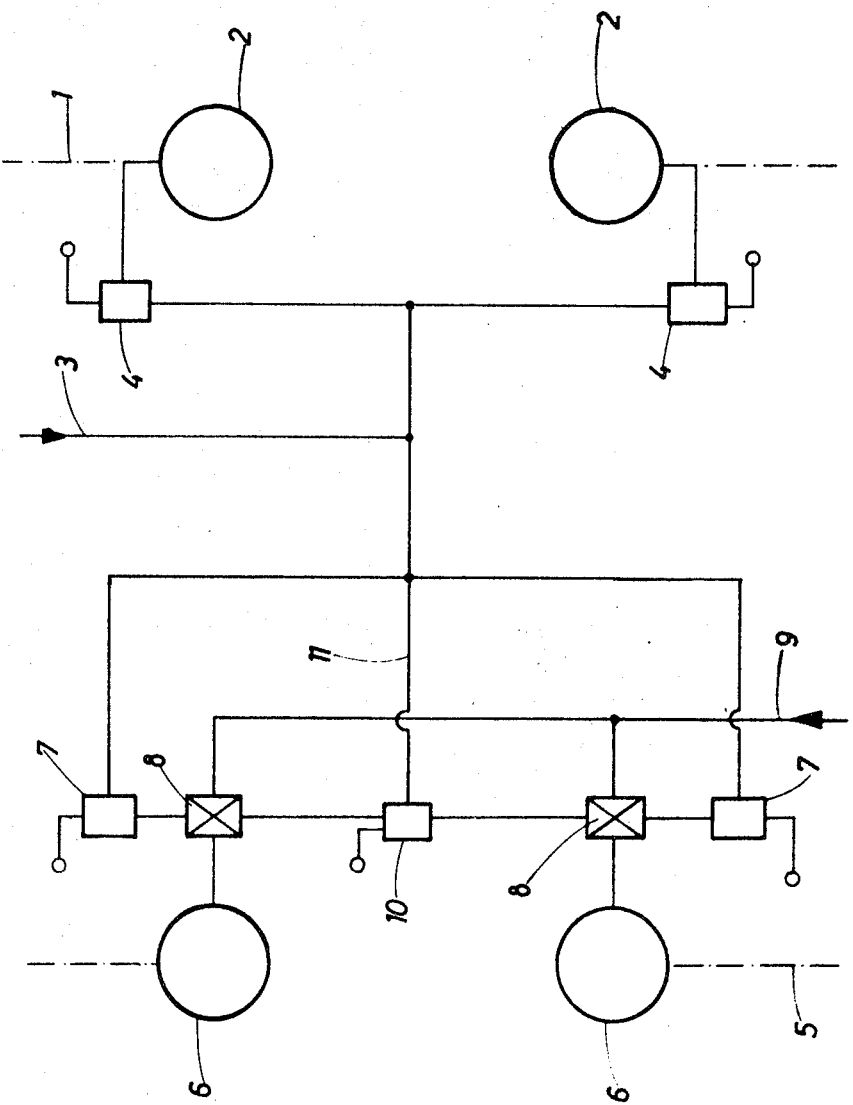

PNEUMATIC SUSPENSION SYSTEM FOR VEHICLES

The present invention relates to a pneumatic suspension system for vehicles, more particularly, to railway vehicles in which the body is supported by pneumatic bellows which are controlled by pneumatic control valves.

It has been known to support the body of a railway vehicle in a four-point suspension wherein four pressure bellows are positioned adjacent the corners of the body with the bellows being controlled individually and independently of each other by four pneumatic control valves positioned adjacent the respective bellows. These valves control the supplying of fluid under pressure or exhausting the pressurized fluid from the respective bellows. Where the vehicle body is supported by a three-point suspension the pressure bellows located under one end of the vehicle body are connected pneumatically to each other and are controlled jointly by a pneumatic valve. The other two bellows are controlled independently of each other by two individual control valves as in the case of a four-point suspension.

Except at low speeds, the four-point suspension system is an effective supporting arrangement particularly against swaying of the vehicles since the bellows on each side of the vehicle counteract any swaying of the vehicle body at the sides and ends thereof. However, when the vehicle is travelling at a slow speed the four-point suspension has considerably less stability than a three-point suspension system and is not generally approved for railway use particularly with respect to derailments. In addition, vehicles employing the four-point suspension system are subjected to high air losses when the vehicle stands on a inclined curve since on one side of the vehicle the control valves may be in the "pressurizing" position whereas on the other side of the vehicle the valves are in the "exhausting" position.

These disadvantages do not appear in a three-point suspension system since, in effect, a single pressure bellows on each side of the vehicle absorb the swaying motion of the vehicle body. However, when oscillation of greater magnitude occur, such as at higher speeds of travel, the suspension obtained by means of a single pressure bellows is relatively weak and the result is a pronounced swaying of the vehicle and consequently the vehicle exhibits a lack of stability.

It is therefore the principal object of the present invention to provide a novel and improved pneumatic suspension system for vehicles.

It is another object of the present invention to provide a pneumatic suspension system for vehicles which avoids the disadvantages of both the three and four-point suspension arrangements.

The objects of the present invention are achieved and the disadvantages of the prior art are eliminated by the present invention which essentially discloses a pneumatic suspension system which when connected to a three-point suspension arrangement can be switched by means of a switching device into a four-point suspension system and, inversely, from a four-point to a three-point suspension system. A plurality of pneumatic bellows support a vehicle body in a four-point suspension and a plurality of pneumatic control valves connect the respective bellows to a source of air under pressure. Means are provided for switching the pneumatic bellows into a three-point suspension. The switching means may comprise a plurality of two-way switches connected to two of the bellows and the respective control valves at one end of the vehicle with these switches being actuated in response to the speed of the vehicle.

Other objects and advantages of the present invention will be apparent upon reference to the accompanying description when taken in conjunction with the drawing, which is exemplary, which illustrates schematically the pneumatic suspension system according to the present invention. An embodiment of the invention will next be described in detail.

As may be seen in the drawing, a pair of pneumatic bellows 2 are positioned above an axle indicated at 1 of a vehicle so as to support one end of the vehicle and are supplied with air under pressure from an air line 3 over pneumatic control valves 4 with one control valve being provided for each pressure bellows. The air line 3 is connected to a source of air under pressure and the pneumatic control valves are a type known in the art, such as described in U.S. Pat. No. 2,670,201. Each of the control valves are controlled in a known manner through a mechanical lever arrangement. In one position, a control valve introduces air under pressure into its respective bellows to pressurize the bellows. In a second position the bellows is shut off and in a third position air is evacuated from the bellows.

In a like manner, the other end of the vehicle is supported above an axle 5 by means of a pair of pneumatic bellows 6 with each bellows being controlled by its respective pneumatic control valve 7 which may be similar to above-described valve 4.

Reversing or two-way switching valves 8, which are well known in the art, are connected between the pneumatic bellows 6 and the control valves 7 and are actuated by a control line 9. In one position the reversing two-way switching valves 8 connect pressure bellows 6 to their respective control valves 7 so that the bellows are operated individually and independently of each other and in the second position the control valves 7 are shut off from the bellows 6 and connected to an additional pneumatic control valve 10, similar to the control valves described above, so that the bellows 6 are controlled jointly. The control valve 10 is connected through line 11 to the air line 3.

When the control valves 7 are disconnected from their respective pressure bellows 6, these bellows are pressurized or evacuated only through the control valve 10 which functions in the manner of a mean levelling valve. Since the pressure bellows 6 act jointly, the vehicle body is now effectively supported by a three-point suspension system. A switching of the valves 8 thus provides either a four-point suspension system or a three-point suspension of the vehicle body.

The actuation of the switching valve 8 may be accomplished manually or automatically such as a function of the speed of the vehicle, at a predetermined minimum speed, such as of the order of 5–10 miles per hour, a speed responsive switch may be provided for actuating the switching devices to attain the suspension which is more favorable for the particular speed of the vehicle. For example, when the vehicle is slowing down and its speed drops below the minimum speed the switching device may be actuated to change from a four-point to a three-point suspension with the reverse sequence occurring as the speed of the vehicle increases above the minimum critical speed.

The critical switching speed may be tied in with pneumatic actuated door closing devices which have been used in railway vehicles for passenger travel. Such door closing devices are generally supplied with air under pressure only after the speed of the vehicle drops below a predetermined value. Thus, when the speed of the vehicle drops below that value where air is introduced so as to make the door opening devices actuable the switching device may also be actuated to change from a four-point to a three-point suspension.

If the door closing device can not be connected to control directly the switching device of pneumatic suspension the switching device may be actuated by a solenoid valve which in turn may be controlled by the door closing device or by an axle driven generator.

In a modification of the pneumatic suspension as described above a reversing switch connected to the control line may be mounted on one end of the vehicle between at least one pressure bellows 6 and its corresponding pneumatic control valve 7. In one switching position, the switching device would connect the two pressure bellows 6 at one end of the vehicle individually of each other to the pneumatic control valves 7 associated with the bellows. In its other switching position the pressure bellows would be connected jointly to a pneumatic control valve. Thus, the modification provides a single switching device which could connect the pneumatic suspension system between a three-point or four-point suspension.

Thus it can be seen that the present invention has disclosed a simple but effective pneumatic suspension system for vehicles which can be quickly and reliably changed between a three-point and a four-point suspension, as may desired or in response to various conditions, such as the speed of the vehicle.

It is understood that this invention is susceptible to modification in order to adapt it to different usages and conditions and, accordingly, it is desired to comprehend such modifications within the invention as may fall within the scope of the appended claims.

What is claimed is:

1. In a pneumatic suspension system for vehicles, the combination of a plurality of pneumatic bellows supporting a vehicle in a four-point suspension, a plurality of pneumatic control valves connected to the respective bellows and to a source of air under pressure, and means for switching said pneumatic bellows into a three-point suspension wherein two pneumatic bellows supporting one of the vehicle are actuated jointly and two bellows at the other end of the vehicle are actuated independently of each other.

2. In a pneumatic suspension system as claimed in claim 1 wherein said switching means interconnects said control valves to control the bellows at two points simultaneously so that the plurality of bellows support the vehicles in a three-point suspension.

3. In a pneumatic suspension system as claimed in claim 1 wherein said switching means is responsive to the speed of the vehicle.

4. In a pneumatic suspension system as claimed in claim 1 wherein the vehicle has a pneumatic door closing device which can be actuated only when the speed of the vehicle is below a predetermined minimum speed, and means interconnecting said door closing device and said switching means for actuating said switching means when said door closing device is actuable.

5. In a pneumatic suspension system as claimed in claim 4 and comprising a solenoid valve actuated in response to the door closing device to operate said switching means.

6. In a pneumatic suspension system as claimed in claim 1 wherein two bellows are positioned at each end of the vehicle to define a four-point suspension, a control line having a control valve therein connected to the source of air under pressure, said switching means being connected between each of the two bellows at one end and its respective control valve and to said control line, said switching means having a first position connecting said two bellows individually to their respective control valve and a second position connecting said two bellows to said control line valve.

7. In a pneumatic suspension system as claimed in claim 6 wherein said switching means comprises two switching valves with each switching valve being connected between one of said two bellows and its respective control valve, said control line valve comprising a mean levelling valve, in said second switching position said switching means connecting jointly said two bellows to said means levelling valve so that said two bellows are actuated together to define a single suspension point.

* * * * *